United States Patent
Liu et al.

(10) Patent No.: US 11,088,424 B2
(45) Date of Patent: Aug. 10, 2021

(54) BATTERY MODULE

(71) Applicant: Contemporary Amperex Technology Co., Limited, Ningde (CN)

(72) Inventors: Xiaorong Liu, Ningde (CN); Bin Zhao, Ningde (CN); Chao Yang, Ningde (CN); Zonghuo Chen, Ningde (CN); Anwei Wu, Ningde (CN); Zhiguang Qu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 14 days.

(21) Appl. No.: 16/555,029

(22) Filed: Aug. 29, 2019

(65) Prior Publication Data
US 2020/0243831 A1  Jul. 30, 2020

(30) Foreign Application Priority Data
Jan. 28, 2019 (CN) .......................... 201910080691.3

(51) Int. Cl.
*H01M 2/26* (2006.01)
*H01M 2/10* (2006.01)
(Continued)

(52) U.S. Cl.
CPC ......... *H01M 50/531* (2021.01); *H01M 50/20* (2021.01); *H01M 50/209* (2021.01); *H01M 50/502* (2021.01)

(58) Field of Classification Search
CPC ............. H01M 10/0463; H01M 2/021; H01M 2/0212; H01M 2/1061; H01M 2/1077;
(Continued)

(56) References Cited

U.S. PATENT DOCUMENTS 8,460,817 B2  6/2013 Rourke et al.
2009/0220853 A1*  9/2009 Yang ..................... H01M 50/20
429/159

(Continued)

FOREIGN PATENT DOCUMENTS

CN  103650208 B  4/2016
CN  206022463 U  3/2017
(Continued)

OTHER PUBLICATIONS

The extended European search report for European Application No. 19195611.9, dated Mar. 17, 2020, 8 pages.
PCT International Search Report for PCT/CN2019/129293, dated Apr. 8, 2020, 9 pages.

*Primary Examiner* — Lingwen R Zeng
(74) *Attorney, Agent, or Firm* — Law Offices of Liaoteng Wang (57) ABSTRACT

The present disclosure relates to a battery module comprising a first battery unit and a second battery unit, each of which comprises N secondary batteries, N is an integer greater than or equal to 2, and each secondary battery comprises a first electrode lead and a second electrode lead having opposite polarities. The first electrode lead has a melting point higher than that of the second electrode lead, and N first electrode leads of the first battery unit and N second electrode leads of the second battery unit are arranged to form a layered construction. The battery module has a plurality of connection points distributed in the layered construction, the number of which is greater than or equal to N, and each connection point is adapted to electrically connect one first electrode lead of the first battery unit to at least one second electrode lead of the second battery unit.

9 Claims, 9 Drawing Sheets

(51) Int. Cl.
  *H01M 2/20* (2006.01)
  *H01M 50/531* (2021.01)
  *H01M 50/20* (2021.01)
  *H01M 50/209* (2021.01)
  *H01M 50/502* (2021.01)

(58) Field of Classification Search
  CPC ........ H01M 2/202; H01M 2/26; H01M 50/20; H01M 50/209; H01M 50/502; H01M 50/531; H01M 50/543; H01M 50/557; Y02E 60/10
  See application file for complete search history.

(56) References Cited

U.S. PATENT DOCUMENTS

| | | | |
|---|---|---|---|
| 2011/0195296 A1 | 8/2011 | Kim et al. | |
| 2012/0315531 A1* | 12/2012 | Lev | H01M 2/204 |
| | | | 429/159 |
| 2015/0280275 A1* | 10/2015 | Aizawa | H01M 10/0431 |
| | | | 429/94 |

FOREIGN PATENT DOCUMENTS

| | | |
|---|---|---|
| CN | 206293534 U | 6/2017 |
| CN | 206742365 U | 12/2017 |
| CN | 207134420 U | 3/2018 |
| CN | 108987655 A | 12/2018 |
| CN | 208507761 U | 2/2019 |
| EP | 3154108 A1 | 4/2017 |
| KR | 20120010928 A | 2/2012 |

* cited by examiner

BATTERY MODULE

CROSS REFERENCE TO RELATED APPLICATION

This application claims priority to Chinese Patent Application No. 201910080691.3, filed on Jan. 28, 2019, which is hereby incorporated by reference in its entirety.

TECHNICAL FIELD

The present disclosure relates to a technical filed of battery, and particularly relates to a battery module.

BACKGROUND

The existing secondary batteries are usually electrically connected to each other by a U-shaped connecting piece. In the practical operation, after one side of the U-shaped connecting piece is welded to an electrode lead of a corresponding secondary battery, the welded region will definitely be pulled by ultrasonic vibrations when the other side of the U-shaped connecting piece is welded to an electrode lead of a corresponding secondary battery. Therefore, welding strength and thus safety and service life of the battery module will be affected.

In order to avoid the affection of the second welding on the first welding in the two welding processes, one welding process is employed, in which the electrode leads to be electrically connected are bent together and welded. The secondary battery includes a first electrode lead and a second electrode lead. Since a single battery has a small voltage and current, it is often required to connect the batteries in series and/or in parallel. In this case, it is necessary to sequentially stack and connect a plurality of first electrode leads and a plurality of second electrode leads. Since materials of the first electrode lead and the second electrode lead are different, during the welding, there are a plurality of different weld layers, that is, first electrode lead-first electrode lead weld layer, first electrode lead-second electrode lead weld layer, and second electrode lead-second electrode lead weld layer. During ultrasonic welding, welding temperature for welding the first electrode lead to the first electrode lead is different from welding temperature for welding the second electrode lead to the second electrode lead, and the weld layer having a high temperature will affect the weld layer having a low temperature. As a result, an excessive plastic flow may occur during welding, which will bring voids and affect the welding strength.

SUMMARY

The present disclosure provides a battery module, which can improve connection reliability of electrode leads in the battery module.

The embodiments of the present disclosure provide a battery module comprising a first battery unit and a second battery unit, each of which comprises N secondary batteries, wherein N is an integer greater than or equal to 2, and each of the secondary batteries comprises a first electrode lead and a second electrode lead having opposite polarities. The first electrode lead has a melting point higher than that of the second electrode lead, and N first electrode leads of the first battery unit and N second electrode leads of the second battery unit are arranged to form a layered construction. The battery module has a plurality of connection points distributed in the layered construction, the number of the connection points is greater than or equal to N, and each of the connection points is adapted to electrically connect one of the first electrode leads of the first battery unit to at least one of the second electrode leads of the second battery unit.

According to one aspect of the present disclosure, the first electrode lead extends in a first direction, and each of the N first electrode leads of the first battery unit has an avoidance area to avoid other first electrode lead(s) in a second direction, wherein the connection point is disposed at the avoidance area so as to connect one of the first electrode leads of the first battery unit to at least one of the second electrode leads of the second battery unit, and the second direction intersects with the first direction.

According to one aspect of the present disclosure, the first electrode lead is formed as a sheet-like electrode lead extending in the first direction, and projections of the N first electrode leads of the first battery unit on a surface of the second electrode lead of the second battery unit are staggered with each other in the second direction.

According to one aspect of the present disclosure, the N secondary batteries of the first battery unit are connected in parallel, and each of the first electrode leads has a dimension less than or equal to 1/N of a dimension of the second electrode lead in the second direction.

According to one aspect of the present disclosure, the first electrode lead has a first connection portion and a first hollow portion, wherein in the first battery unit, the first hollow portion of each of the first electrode leads is disposed corresponding to the first connection portion(s) of other first electrode lead(s) in a layering direction, such that the first connection portion of the first electrode lead is exposed through the first hollow portion(s) of other first electrode lead(s), and the connection points are disposed at the first connection portions.

According to one aspect of the present disclosure, the first hollow portion is an opening provided on the first electrode lead.

According to one aspect of the present disclosure, the first hollow portion has a dimension greater than or equal to twice of a dimension of the connection point in the first direction.

According to one aspect of the present disclosure, the first connection portion of each of the first electrode leads has a dimension less than or equal to 1/N of a dimension of the second electrode lead in the second direction.

According to one aspect of the present disclosure, each of the second electrode leads of the second battery unit is adapted to avoid other second electrode lead(s) in the second direction, such that each of the connection points is adapted to electrically connect one of the first electrode leads of the first battery unit to one of the second electrode leads of the second battery unit.

According to one aspect of the present disclosure, the battery module further comprises an electrical connector having a connection surface, wherein the first electrode leads of the first battery unit and the second electrode leads of the second battery unit (G2) are stacked on the connection surface of the electrical connector.

In the battery module according to the embodiments of the present disclosure, the melting point of the first electrode lead of each secondary battery is higher than that of the second electrode lead, and in the layered construction formed by the N first electrode leads and the N second electrode leads, each connection point is configured to electrically connect one first electrode lead and at least one second electrode lead. As a result, in the welding process, there are merely welding interfaces between the low melting point electrode lead and the low melting point electrode lead and welding interfaces between the low melting point electrode lead and the high melting point electrode lead, and no welding interfaces between the high melting point electrode lead and the high melting point electrode lead exist at the same time. Therefore, during the welding, it is sufficient for the welding temperature to be higher than the melting point of the low melting point electrode lead, and there is no need for the welding temperature to be higher than the melting point of the high melting point electrode lead. Thus, the affection of too high temperature on the welding interface of the low melting point electrode lead can be avoided, generation of voids due to the excessive plastic flow also can be avoided, and the welding strength and connection reliability of the electrode leads can be improved.

BRIEF DESCRIPTION OF THE DRAWINGS

Other features, advantages, and technical effects of the present disclosure will become more apparent by the following detailed description on non-limiting embodiments with reference to accompanying drawings, wherein the same or similar reference numerals indicate the same or similar features.

In the drawings:
G1—first battery unit;
G2—second battery unit;
X—first direction;
Y—second direction;
P—connection point;
100—secondary battery;
121—first electrode lead;
121*a*—first connection portion;
121*b*—first hollow portion;
122—second electrode lead;
122*a*—second connection portion;
122*b*—second hollow portion;
200—electrical connector;
200*a*—connection surface.

DETAILED DESCRIPTION

Features of various aspects and exemplary embodiments of the present disclosure will be described in detail below. To make the objects, technical solutions and advantages of the present disclosure to be more apparent, the present disclosure will be further described in detail below with reference to the accompanying drawings and specific embodiments. It shall be understood that the specific embodiments described herein are only to be construed as illustrative and not limiting. To the person skilled in the art, the present disclosure may be implemented without some of the specific details. The following description of the embodiments is merely intended to provide a better understanding of the present disclosure by way of illustrating examples of the present disclosure.

It shall be noted that, in this context, relational terms such as first and second are merely used to distinguish one entity or operation from another entity or operation, and do not necessarily require or imply any such actual relationship or order between the entities or operations. Further, the term "comprise", "include" or any other variations thereof is intended to encompass a non-exclusive inclusion, such that a process, method, article, or device including a plurality of elements includes not only these elements but also other elements not listed, or elements that are inherent to such process, method, article or device. Without more limitations, an element that is defined by an expression "comprises . . . ", does not exclude other identical elements in the process, method, article, or device comprising this element.

It shall be understood that when describing a configuration of a component, when a layer or a region is referred to as being "above" or "above" another layer or region, it may mean that the layer or region is directly on the another layer or region, or mean that there are other layers or regions between the layer or region and the another layer or region. Moreover, if the component is vertically flipped, the layer or region will be located "below" another layer or region.

Figure 1:
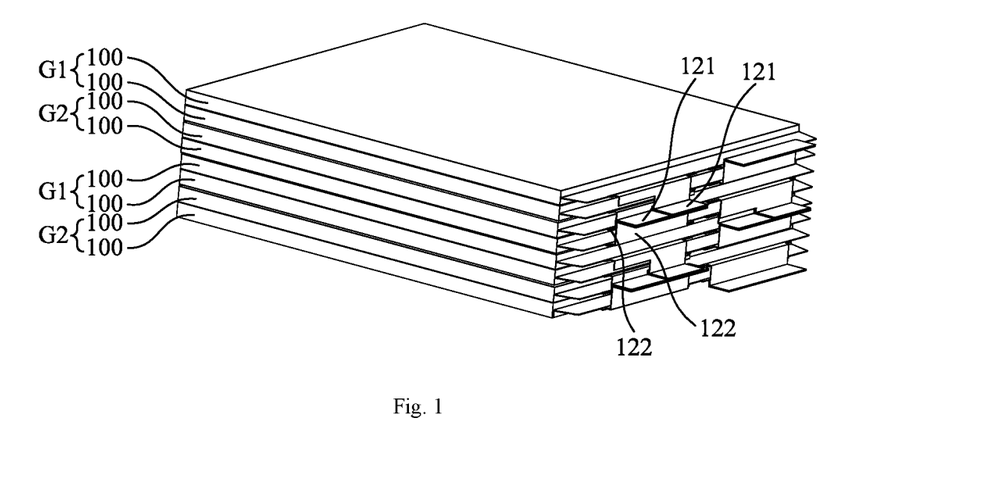
FIG. 1 schematically shows a perspective view of a battery module according to an embodiment of the present disclosure.
Figure 2:
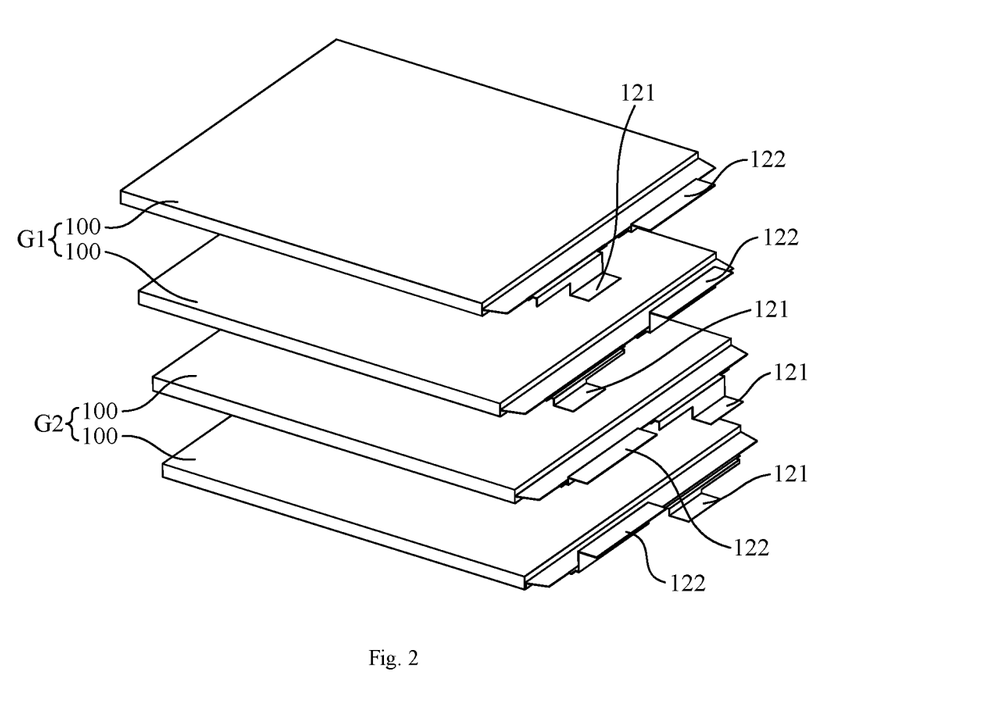
FIG. 2 shows an exploded perspective view of a portion of the battery module as shown in FIG. 1.

An embodiment of the present disclosure provides a battery module. FIG. 1 schematically shows a perspective view of a battery module according to an embodiment of the present disclosure, and FIG. 2 shows an exploded perspective view of a portion of the battery module as shown in FIG. 1. The battery module includes a first battery unit G1 and a second battery unit G2. Each of the first battery unit G1 and the second battery unit G2 includes N secondary batteries 100, wherein N is an integer greater than or equal to 2. Each secondary battery 100 includes a first electrode lead 121 and a second electrode lead 122 having opposite polarities. The first electrode lead 121 has a melting point higher than that of the second electrode lead 122.

In this embodiment, each first battery unit G1 includes two secondary batteries 100, and each second battery unit G2 also includes two secondary batteries 100. The two secondary batteries 100 included in each first battery unit G1 are connected in parallel with each other, the two secondary batteries 100 included in each second battery unit G2 are connected in parallel with each other, and the first battery unit G1 and the second battery unit G2 are connected in series. It can be understood that, in some other embodiments, each first battery unit G1 may include three, four, or other number of secondary batteries 100, and each second battery unit G2 may include three, four, or other number of secondary batteries 100, according to design requirements of the battery module.

Further, the battery module may include only the first battery unit G1 and the second battery unit G2 connected in series, or may be formed by repeatedly stacking a repeat unit in a thickness direction and connecting the repeat units in series, wherein the repeat unit includes the first battery unit G1 and the second battery unit G2 connected in series. In some other embodiments, the battery module may include other battery units.

It should be noted that the melting point of the first electrode lead 121 herein is specifically understood as a melting point of a surface material of the first electrode lead 121, and the melting point of the second electrode lead 122 herein is specifically understood as a melting point of a surface material of the second electrode lead 122. For example, in some embodiments, the second electrode lead 122 is made of an aluminum material, and the melting point of the second electrode lead 122 refers to a melting point of the aluminum material; and in some embodiments, the first electrode lead 121 is made of a copper material with nickel plated on a surface of the copper material, and the melting point of the first electrode lead 121 refers to a melting point of the nickel material.

As described above, in some embodiments, the first electrode lead 121 is made of the copper material, and the surface of the first electrode lead 121 has a plating layer, for example, nickel plating layer, so as to avoid an accelerated aging of sealing plastic included in the battery module caused by the copper electrode lead. In the case that the second electrode lead 122 is made of the aluminum material, since a diffusion region of the aluminum-nickel weld has a thickness of about 20 µm, in some embodiments, the plating layer (for example, a nickel layer) on the surface of the first electrode lead 121 is configured to have a thickness of 20 µm or more, to ensure that the welding only has aluminum-nickel diffusion, and thus ensure consistency and stability of the welding.

In an embodiment of the present disclosure, N first electrode leads 121 of the first battery unit G1 and N second electrode leads 122 of the second battery unit G2 are arranged to form a layered construction.

Figure 3A:
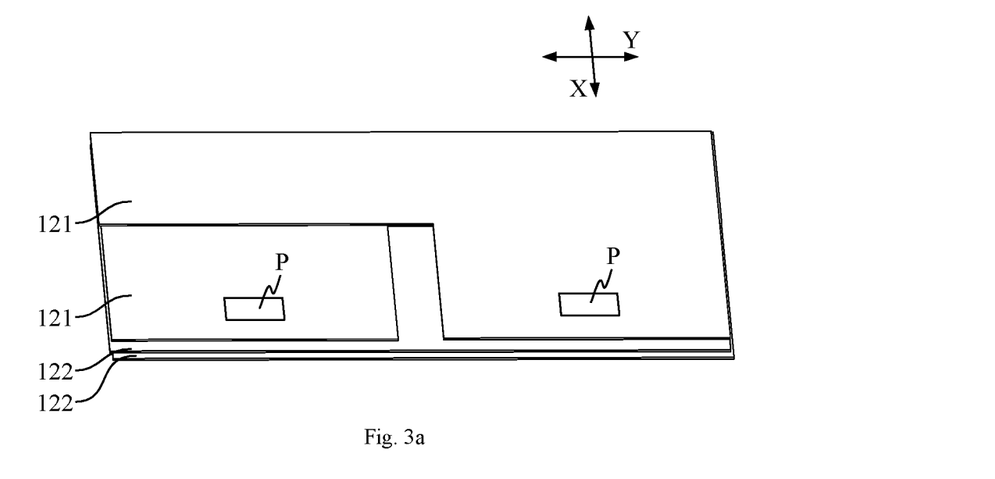
FIG. 3*a* schematically shows a perspective view of a first layered construction according to an embodiment of the present disclosure.
Figure 3B:
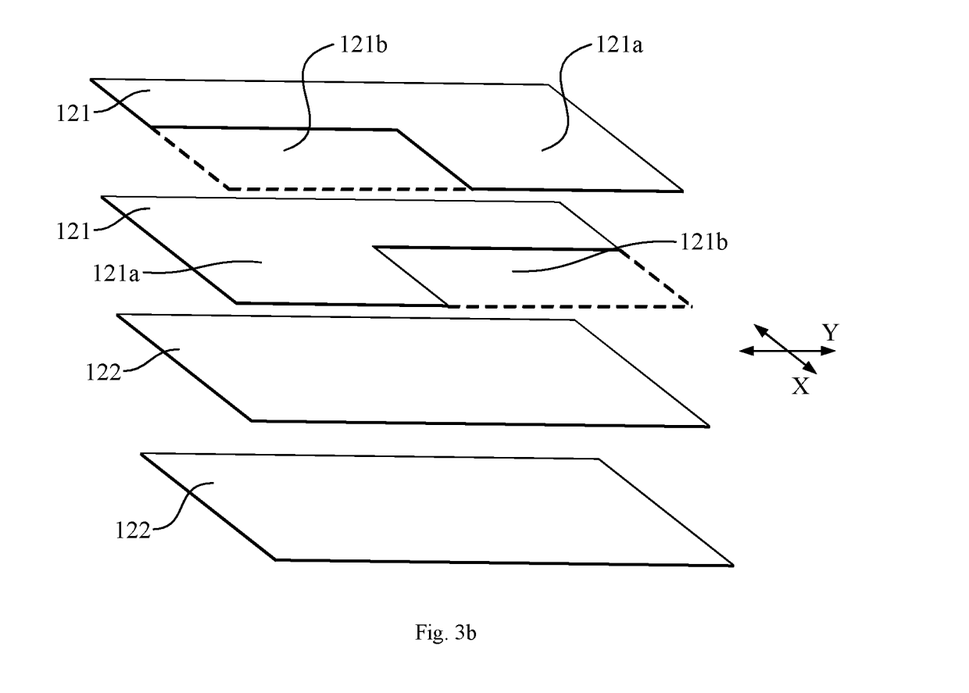
FIG. 3*b* schematically shows an exploded perspective view of the first layered construction according to an embodiment of the present disclosure.

FIG. 3a schematically shows a perspective view of a first layered construction according to an embodiment of the present disclosure, and FIG. 3b shows an exploded perspective view of the layered construction as shown in FIG. 3a. Wherein, the battery module has a plurality of connection points P distributed in the layered construction, the number of connection points P is greater than or equal to N, and each of the connection points P is configured to electrically connect one of the first electrode leads 121 of the first battery unit G1 to at least one of the second electrode leads 122 of the second battery unit G2.

The aforementioned connection point P may be a connection point formed in the welding process. The welding process may be performed by ultrasonic welding, in which metal pieces are subjected to ultrasonic high-frequency vibration under a certain static pressure, welded metal interfaces of the metal pieces rub against each other to generate heat, plastic flow occurs and finally an atomic stress range is reached to form a metal bond.

In the embodiment of the present disclosure, the melting point of the first electrode lead 121 of each secondary battery 100 is higher than that of the second electrode lead 122. In the case that the melting point of the first electrode lead 121 is higher than that of the second electrode lead 122, since a temperature (hereinafter referred to as a welding temperature) at which the plastic flow occurs during welding, is proportional to the melting point, the first electrode lead 121 has a welding temperature higher than that of the second electrode lead 122. In this case, the first electrode lead 121 can be regarded as a high melting point electrode lead, and the second electrode lead 122 can be regarded as a low melting point electrode lead.

If denoting the melting point of the high melting point electrode lead as T1, and denoting the melting point of the low melting point electrode lead as T2, in the case that T1−T2>50% T2, the welding stability of the low melting point electrode lead will be affected greatly by the welding of the high melting point electrode lead. Specifically, when the welding between the high melting point electrode lead and the high melting point electrode lead, and the welding between the low melting point electrode lead and the low melting point electrode lead are simultaneously performed, since the high melting point electrode leads have a higher welding temperature, the plastic flow of the low melting point electrode leads occurs earlier, and voids are easily generated.

In the battery module according to the embodiment of the present disclosure, in the layered construction formed by the N first electrode leads 121 and the N second electrode leads 122, each of the connection points P is configured to electrically connect one of the first electrode leads 121 to at least one of the second electrode leads 122. As a result, during the welding, there are merely welding interfaces between the low melting point electrode lead and the low melting point electrode lead and welding interfaces between the low melting point electrode lead and the high melting point electrode lead, and no welding interfaces between the high melting point electrode lead and the high melting point electrode lead exist at the same time. Therefore, during the welding, it is sufficient for the welding temperature to be higher than the melting point of the low melting point electrode lead, and there is no need for the welding temperature to be higher than the melting point of the high melting point electrode lead. Thus, the affection of a too high temperature on the welding interface of the low melting point electrode lead can be avoided, generation of voids due to the excessive plastic flow also can be avoided, and a welding strength and connection reliability of the electrode leads can be improved.

In the layered construction as shown in FIG. 3a and FIG. 3b, the first electrode lead 121 is configured to extend in a first direction X, and each of the N first electrode leads 121 of the first battery unit G1 has an avoidance area to avoid other first electrode lead 121 in a second direction Y, wherein the connection point P is disposed at the avoidance area so as to connect one of the first electrode leads 121 to at least one of the second electrode leads 122, and the second direction Y is configured to intersect with the first direction X. In the present embodiment, the second direction Y is perpendicular to the first direction X. Since the first electrode leads 121 have the avoidance areas and the plurality of connection points P are located at the avoidance areas, the plurality of connection points P can be formed at the same time by welding for one time in the welding process, that is, the connection of the N first electrode leads 121 and the N second electrode leads 122 in the layered construction can be realized by welding for one time, which can improve an efficiency of the welding process. Wherein, a plurality of welding positions corresponding to the plurality of connection points P may be provided in a welding device.

In the layered construction as shown in FIG. 3*a* and FIG. 3*b*, the first electrode lead 121 has a first connection portion 121*a* and a first hollow portion 121*b*. In the first battery unit G1, the first hollow portion 121*b* of each of the first electrode leads 121 is disposed corresponding to the first connection portion 121*a* of the other first electrode lead 121 in a layering direction, such that the first connection portion 121*a* of the first electrode lead 121 is exposed through the first hollow portion 121*b* of the other first electrode lead 121. Further, since the connection point P is disposed on the first connection portion 121*a*, it is convenient for the welding device to directly weld each first electrode lead 121 to the second electrode lead 122 of the second battery unit G2, thereby improving convenience of the welding.

In the above embodiment, the first hollow portion 121*b* is formed as an opening provided on the first electrode lead 121. Specifically, the first electrode lead 121 of the present embodiment may be formed by make a cut on an electrode plate having a width the same as that of the first connection portion 121*a*, wherein the vacant portion of the electrode lead corresponding to the cut off part serves as the first hollow portion 121*b*. In the present embodiment, the first hollow portion 121*b* is formed by making an inward opening at one edge of the first electrode lead 121.

In some embodiments, the first hollow portion 121*b* has a dimension greater than or equal to twice of a dimension of the connection point P in the first direction X, such that it is sufficient to complete the welding process at an area of each first connection portion 121*a* exposed through the first hollow portions 121*b* of other first electrode leads 121 and obtain the connection point P, by which a reliable connection can be achieved.

In some embodiments, the first connection portion 121*a* of each of the first electrode leads 121 has a dimension less than or equal to 1/N of a dimension of the second electrode lead 122 in the second direction Y, so that the first connection portion 121*a* of each of the N first electrode leads 121 can be exposed through the first hollow portions 121*b* of other first electrode leads 121, and do not overlap with the first connection portions 121*a* of the other first electrode leads 121, thereby ensuring to obtain a stable welding connection point P.

In the above-described layered construction as shown in FIG. 3*a* and FIG. 3*b*, each of the first electrode leads 121 of the first battery unit G1 is electrically connected to at least one of the second electrode leads 122 of the second battery unit G2, and the N second electrode leads 122 of the second battery unit G2 are electrically connected to each other, thereby achieving the electrical connection of the N first electrode leads 121 of the first battery unit G1 with the N second electrode leads 122 of the second battery unit G2 in the layered construction. In some other embodiments, other structures may further be included to achieve the electrical connection among the various electrode leads in the layered construction.

Figure 4A:
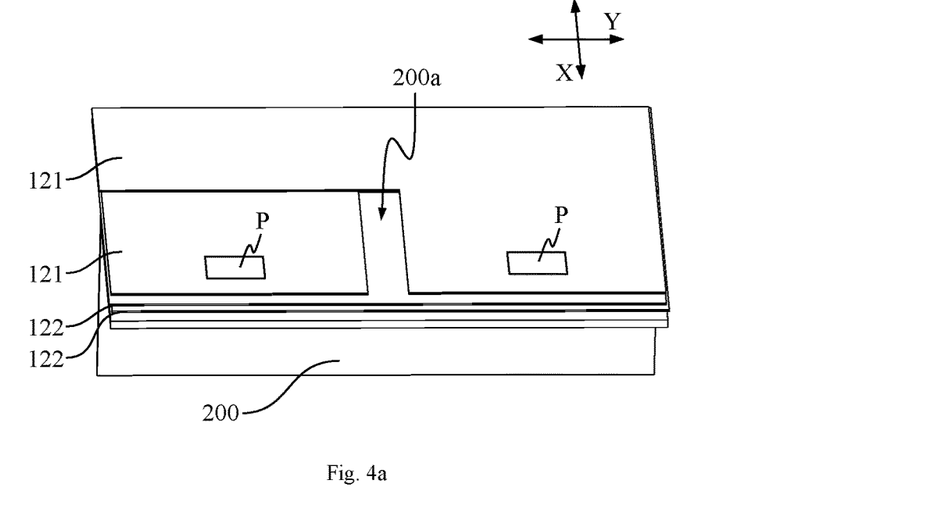
FIG. 4*a* schematically shows a perspective view of a second layered construction according to an embodiment of the present disclosure.
Figure 4B:
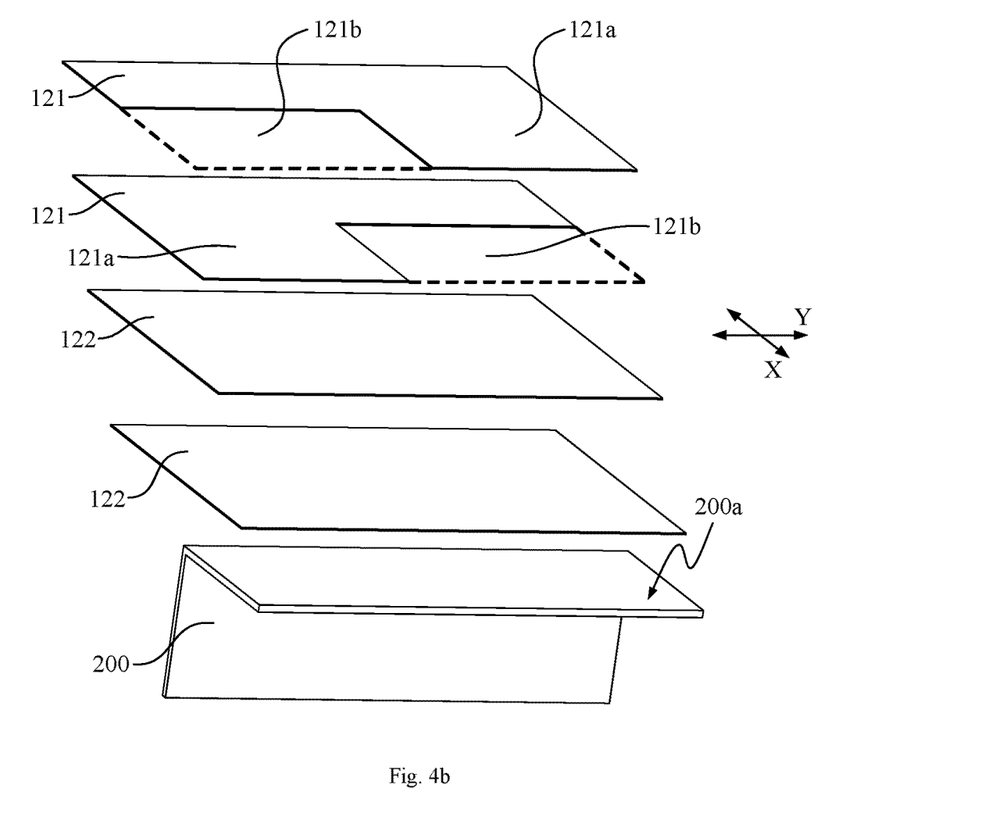
FIG. 4*b* schematically shows an exploded perspective view of the second layered construction according to an embodiment of the present disclosure.

FIG. 4*a* schematically shows a perspective view of a second layered construction according to an embodiment of the present disclosure, and FIG. 4*b* shows an exploded perspective view of the layered construction as shown in FIG. 4*a*. Most structures of the second layered construction are substantially the same as those of the first layered construction, and will not be described in detail. The difference lies in that, the battery module of the present embodiment further includes an electrical connector 200. The electrical connector 200 has a connection surface 200*a*. The first electrode leads 121 of the first battery unit G1 and the second electrode leads 122 of the second battery unit G2 are stacked on the connection surface 200*a* of the electrical connector 200, and each of the connection points P is configured to electrically connect one of the first electrode leads 121 of the first battery unit G1 and the N second electrode leads 122 of the second battery unit G2 to the connection surface 200*a* of the electrical connector 200, so as to achieve the electrical connection among the various electrode leads in the layered construction.

In some embodiments, the melting point of the first electrode lead 121 is higher than the melting point of the second electrode lead 122. In each of the layered constructions, the N second electrode leads 122 of the second battery unit G2 are stacked on the connection surface 200*a* of the electrical connector 200, and the N first electrode leads 121 of the first battery unit G1 are stacked on the N second electrode leads 122 of the second battery unit G2.

In some embodiments, the electrical connector 200 may function as a busbar for connecting the first battery unit G1 and the second battery unit G2 to a sampling circuit, so as to facilitate data sampling and battery management.

In the above-described layered constructions, the description has been made by taking an example in which each first battery unit G1 includes two secondary batteries 100, and each second battery unit G2 also includes two secondary batteries 100. It can be understood that each first battery unit G1 and each second battery unit G2 may include other numbers of secondary batteries 100.

Figure 5A:
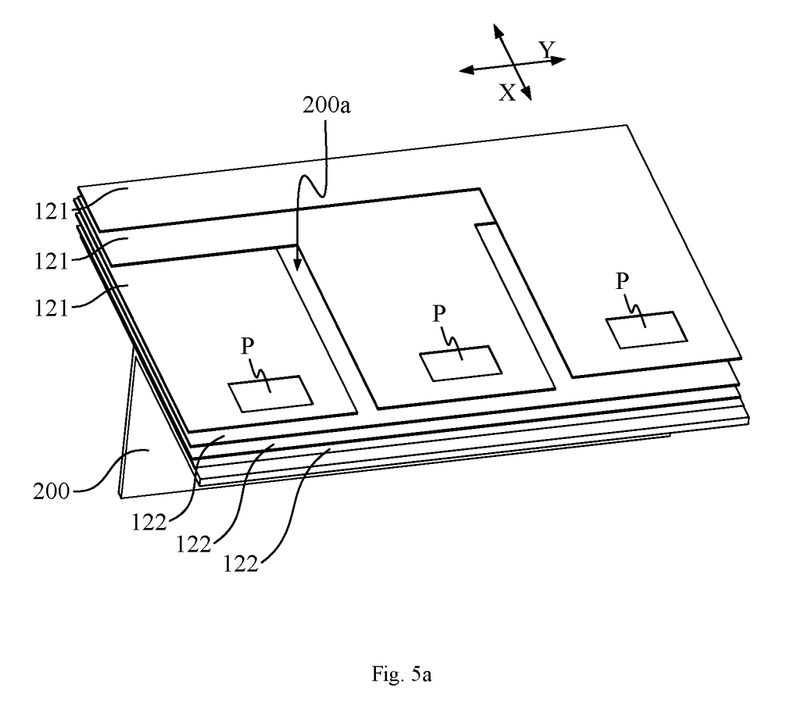
FIG. 5*a* schematically shows a perspective view of a third layered construction according to an embodiment of the present disclosure.
Figure 5B:
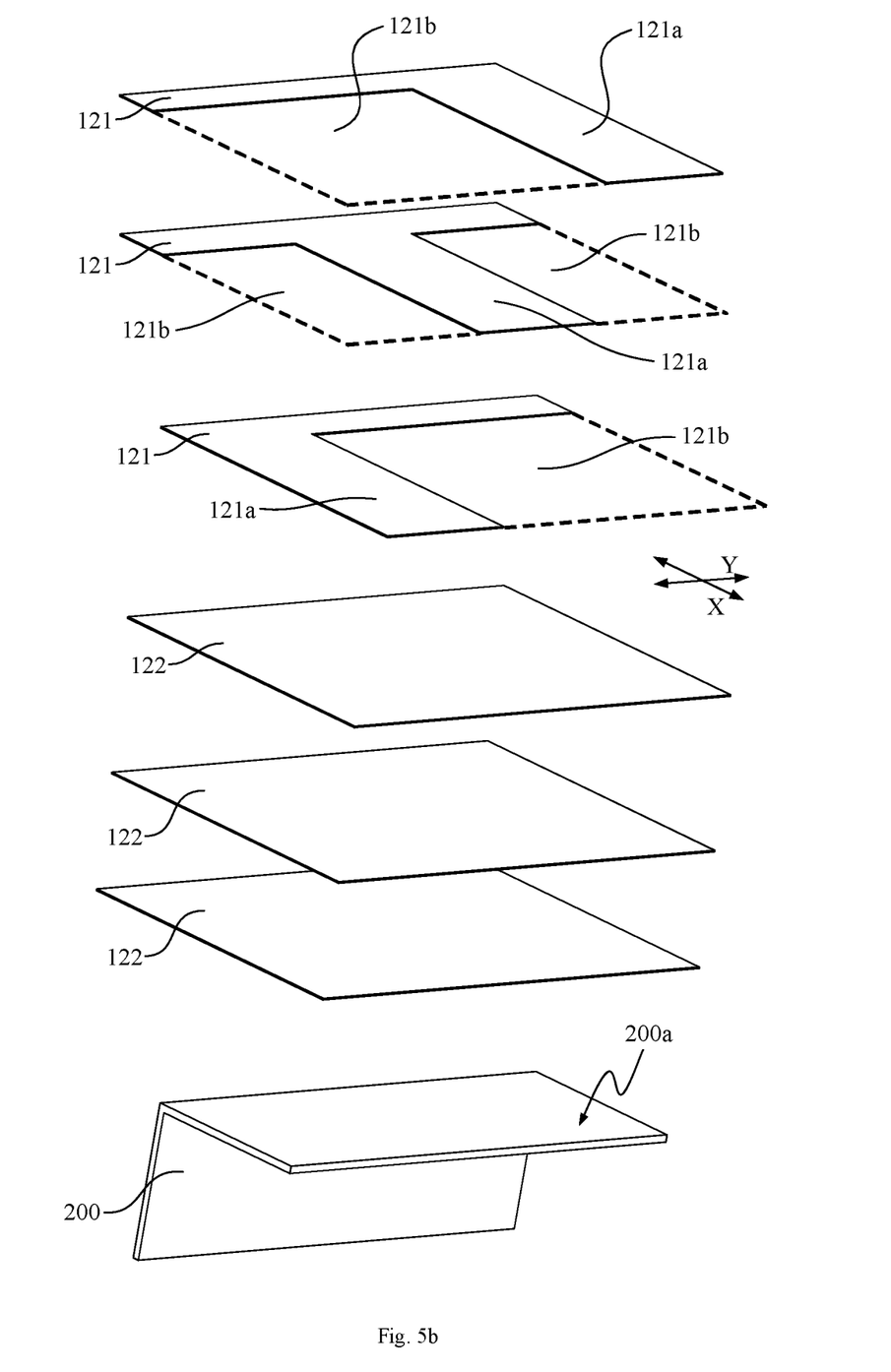
FIG. 5*b* schematically shows an exploded perspective view of the third layered construction according to an embodiment of the present disclosure.

FIG. 5*a* schematically shows a perspective view of a third layered construction according to an embodiment of the present disclosure, and FIG. 5*b* shows an exploded perspective view of the layered construction as shown in FIG. 5*a*. Most structures of the third layered construction are substantially the same as those of the second layered construction, and will not be described in detail. The difference of the third layered construction from the second layered construction lies in that, in the battery module of the present embodiment, each first battery unit G1 includes three secondary batteries 100, and each second battery unit G2 also includes three secondary batteries 100.

The three secondary batteries 100 included in each first battery unit G1 are connected in parallel, the three secondary batteries 100 included in each second battery unit G2 are connected in parallel, and the first battery units G1 and the second battery units G2 are connected in series.

The battery module has a plurality of connection points P distributed in the layered construction, and the number of connection points P is greater than or equal to 3. In the present embodiment, there are three connection points P, and each of the connection points P is configured to electrically connect one of the first electrode leads 121 of the first battery unit G1 to at least one of the second electrode lead 122 of the second battery unit G2. The first electrode lead 121 is configured to extend in a first direction X, and each of the three first electrode leads 121 of the first battery unit G1 has an avoidance area to avoid other first electrode leads 121 in a second direction Y, wherein the connection point P is disposed at the avoidance area, and the second direction Y is configured to intersect with the first direction X.

Since the first electrode leads 121 have the avoidance areas, and the three connection points P are correspondingly located at the avoidance areas of the three first electrode leads 121, the above three connection points P can be formed by welding for one time in the welding process. That is, the connection of the three first electrode leads 121 and the three second electrode leads 122 in the layered construction can be achieved by welding for one time, which can improve the efficiency of the welding process.

In the above embodiment, the first hollow portion 121b is formed as an opening provided on the first electrode lead 121. Specifically, each first hollow portion 121b in the above embodiment is formed by making an inward opening at one edge of the first electrode lead 121. However, the manner of forming the first hollow portion 121b by making an opening on the first electrode lead 121 may not be limited to the above example.

Figure 6:
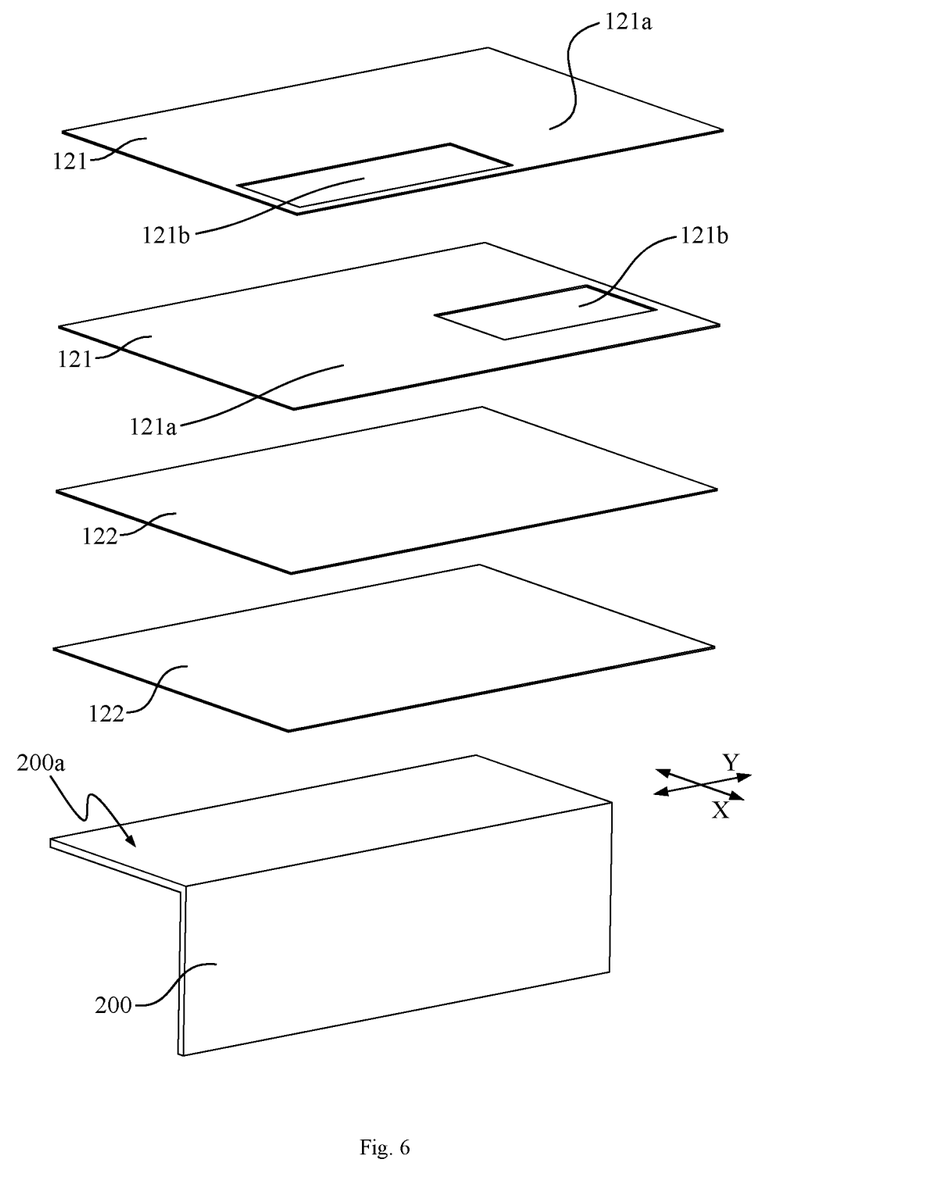
FIG. 6 schematically shows an exploded perspective view of a fourth layered construction according to an embodiment of the present disclosure.

FIG. 6 shows an exploded perspective view of a fourth layered construction, and most structures of the fourth layered construction are substantially the same as that of the second layered construction. The first electrode lead 121 has a first connection portion 121a and a first hollow portion 121b. In the first battery unit G1, the first hollow portion 121b of each of the first electrode leads 121 is disposed corresponding to the first connection portion 121a of the other first electrode lead 121 in a layering direction, so that the first connection portion 121a of the first electrode lead 121 is exposed through the first hollow portion 121b of the other first electrode lead 121, and the connection point is disposed at the first connection portion 121a.

The first hollow portion 121b is formed as an opening provided on the first electrode lead 121. In the present embodiment, the first hollow portion 121b is formed by an internal opening of the first electrode lead 121. Specifically, the first electrode lead 121 of the present embodiment may be formed by punching a hole in an internal region of an electrode lead having a width the same as that of the first connection portion 121a. Wherein, the vacant portion formed by the punching serves as the first hollow portion 121b, and the remaining portion of the first electrode lead 121 after the punching serves as the first connection portion 121a.

In some embodiments, the first connection portion 121a of each of the first electrode leads 121 has a dimension less than or equal to 1/N of a dimension of the second electrode lead 122 in the second direction Y, so that the first connection portion 121a of each of the N first electrode leads 121 can be exposed through the first hollow portions 121b of other first electrode leads 121, and do not overlap with the first connection portions 121a of the other first electrode leads 121, thereby ensuring to obtain a stable welding connection point P.

In the above embodiments, the description is made by taking a sheet-like second electrode lead 122 as an example. In some other embodiments, the second electrode lead 122 can be changed correspondingly according to the design requirements of the battery module.

Figure 7A:
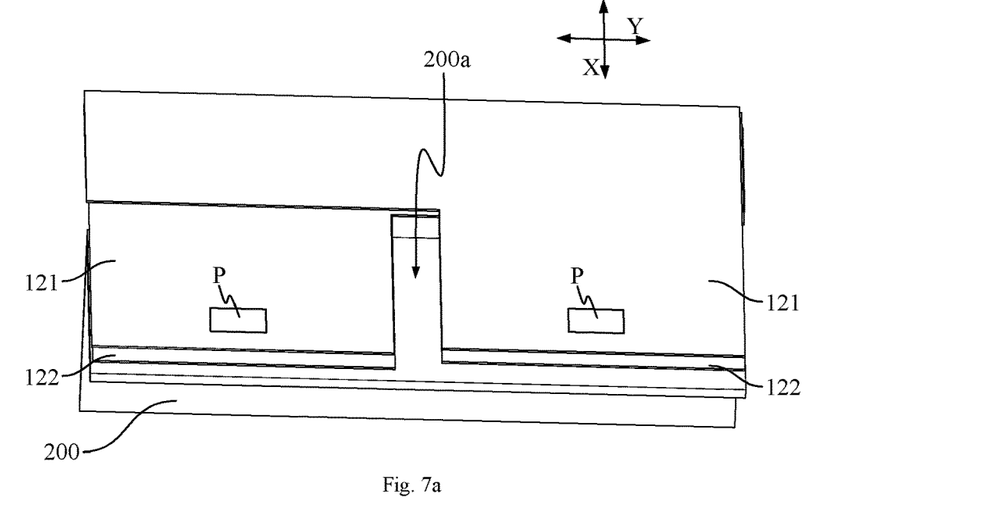
FIG. 7*a* schematically shows a perspective view of a fifth layered construction according to an embodiment of the present disclosure.
Figure 7B:
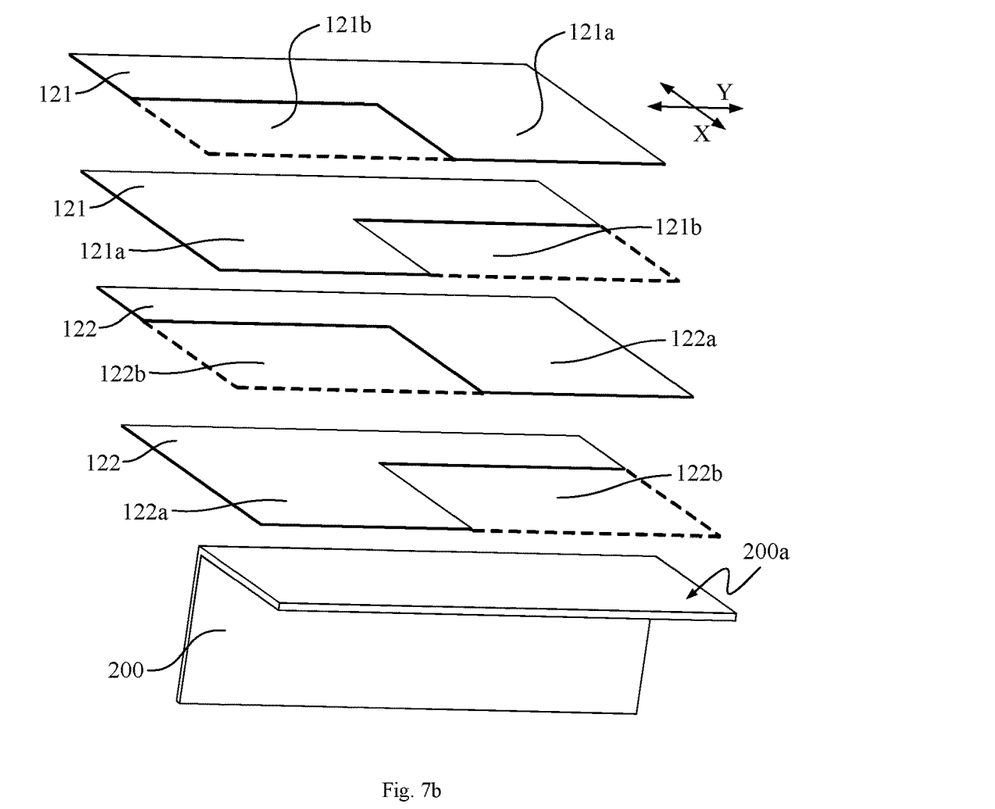
FIG. 7*b* schematically shows an exploded perspective view of the fifth layered construction according to an embodiment of the present disclosure.

FIG. 7a schematically shows a perspective view of a fifth layered construction according to an embodiment of the present disclosure, and FIG. 7b shows an exploded perspective view of the layered construction as shown in FIG. 7a. Most structures of the fifth layered construction are substantially the same as those of the second layered construction, and will not be described in detail. The battery module further includes an electrical connector 200 having a connection surface 200a, and the first electrode leads 121 of the first battery unit G1 and the second electrode leads 122 of the second battery unit G2 are stacked on the connection surface 200a of the electrical connector 200.

Wherein, the present embodiment differs from the second layered construction in that, each of the second electrode leads 122 of the second battery unit G2 is configured to avoid other second electrode lead 122 in the second direction Y, such that each of the connection points is configured to electrically connect one of the first electrode leads 121 of the first battery unit G1 to one of the second electrode leads 122 of the second battery unit G2.

Specifically, the second electrode lead 122 has a second connection portion 122a and a second hollow portion 122b. In the second battery unit G2, the second hollow portion 122b of each of the second electrode leads 122 is disposed corresponding to the second connection portion 122a of the other second electrode lead 122 in a layering direction.

Combining with the first electrode lead 121 having the first connection portion 121a and the first hollow portion 121b, each of the connection points P is configured to electrically connect the first connection portion 121a of one first electrode lead 121 of the first battery unit G1 to the second connection portion 122a of one second electrode lead 122 of the second battery unit G2. Further, each of connection points P is configured to electrically connect the corresponding electrode leads to the connection surface 200a of the electrical connector 200, thereby achieving electrical connection among the various electrode leads in the layered construction.

In the present embodiment, each of the connection points P is used to connect one first electrode lead 121 and one second electrode lead 122, which can reduce a total thickness of the electrode leads connected by each connection point P, and also can improve a welding quality at each connection point P, thereby further improving a reliability of the electrical connection among the various electrode leads in the layered construction.

In addition, in the above embodiment, each of the first electrode leads 121 is provided with the first connection portion 121a and the first hollow portion 121b to provide the avoidance area, and the connection point P is disposed at the avoidance area. In some other embodiments, the avoidance area may be provided by other structures.

Figure 8A:
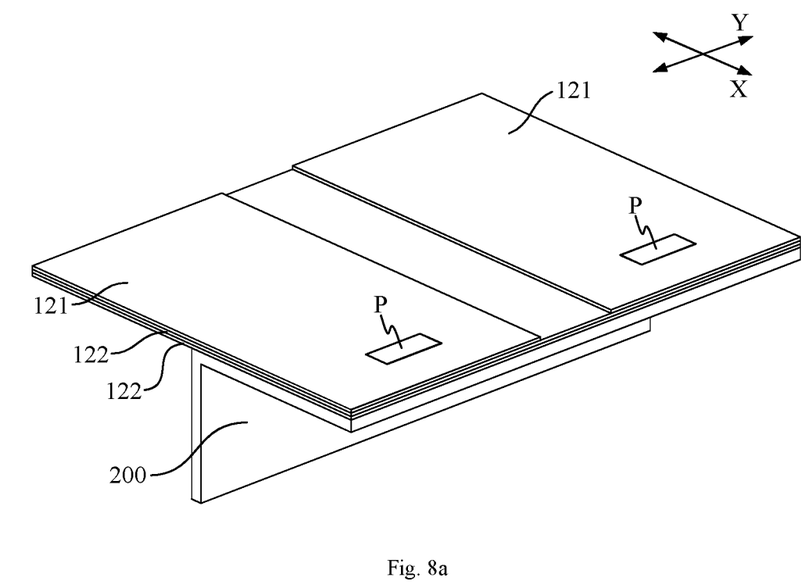
FIG. 8*a* schematically shows a perspective view of a sixth layered construction according to an embodiment of the present disclosure.
Figure 8B:
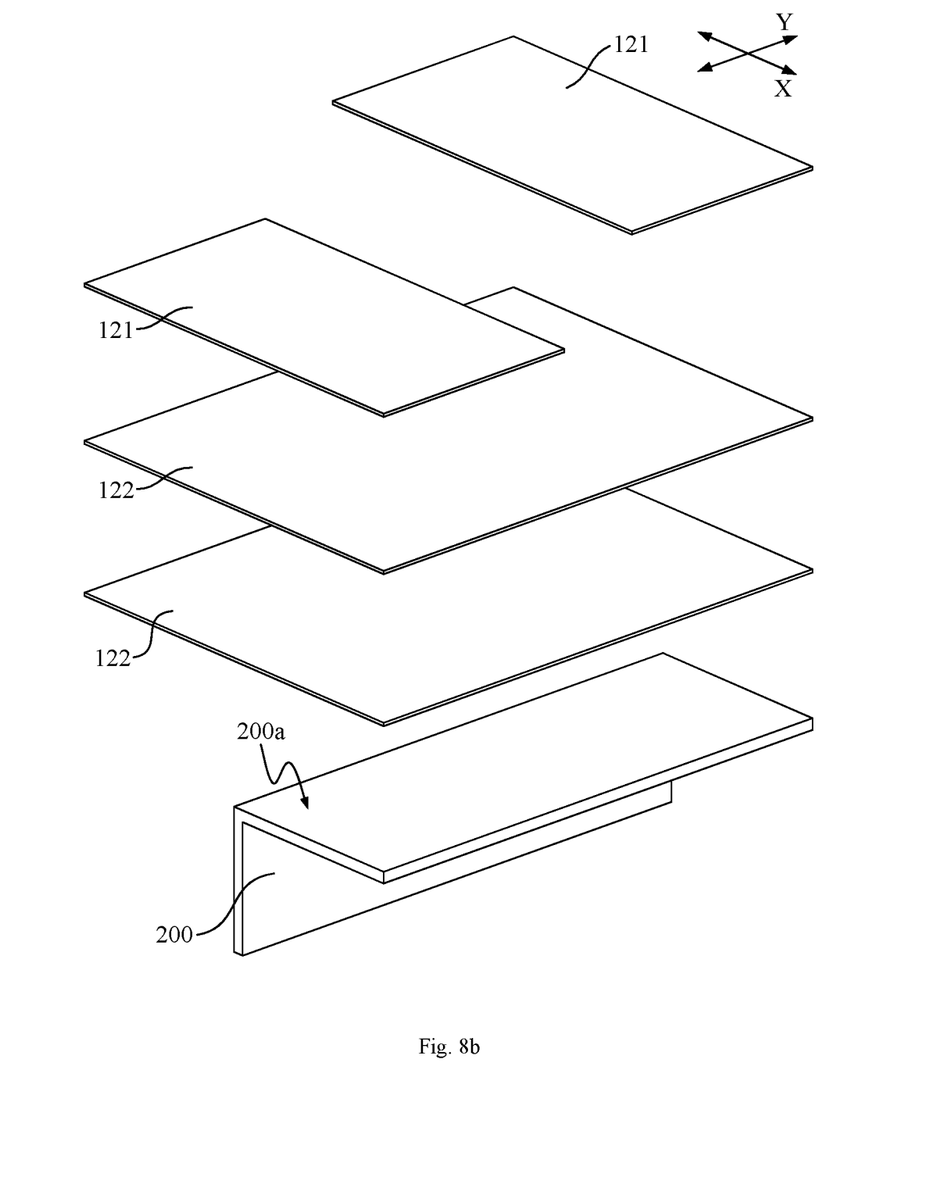
FIG. 8*b* schematically shows an exploded perspective view of the sixth layered construction according to an embodiment of the present disclosure.

FIG. 8a schematically shows a perspective view of a sixth layered construction according to an embodiment of the present disclosure, and FIG. 8b shows an exploded perspective view of the layered construction as shown in FIG. 8a. Wherein, the first electrode lead 121 is configured to extend in the first direction X, and each of the N first electrode leads 121 of the first battery unit G1 has a avoidance area to avoid other first electrode lead in the second direction Y, and the connection point P is disposed at the avoidance area.

Different from the foregoing embodiments, the first electrode lead 121 of the present embodiment is formed as a sheet-like electrode lead extending in the first direction X, and projections of the N first electrode leads 121 of the first battery unit G1 on a surface of the second electrode lead 122 of the second battery unit G2 are staggered with each other in the second direction Y. Correspondingly, the connection point P on each of the first electrode leads 121 is staggered with the connection point P on the other first electrode lead 121 in the second direction Y, thereby facilitating the welding device to directly weld each of the first electrode leads 121 to the second electrode lead 122 of the second battery unit G2, and improving the convenience of the welding.

In some embodiments, the N secondary batteries 100 of the first battery unit G1 are connected in parallel, and each of the first electrode leads 121 has a dimension less than or equal to 1/N of a dimension of the second electrode lead 122, so as to avoid overlapping of the N first electrode leads 121 with each other and thus ensure to obtain a stable welding connection point P.

Further, the battery module according to the embodiment of the present disclosure may include a layered construction in other different forms. By electrically connecting one of the first electrode leads 121 to at least one of the second electrode leads 122 by using each connection point P, the affection of the too high temperature on the welding interfaces including the low melting point electrode lead in the welding process can be avoided, which can avoid the generation of voids due to the excessive plastic flow in the welding, and improve the welding strength and the connection reliability of the electrode leads.

According to the above embodiments of the present disclosure, not all the details are described, and the present disclosure is not limited to the above embodiments. Obviously, many modifications and variations are possible in light of the above description. The above embodiments are selected and specifically described to better explain the principles and practical implementations of the present disclosure, so that the person skilled in the art can use the present disclosure and make modifications based on the present disclosure. The present disclosure is limited only by the scope and the equivalents of the appended claims.

What is claimed is:

1. A battery module, comprising a first battery unit and a second battery unit, each of which comprises N secondary batteries, wherein N is an integer greater than or equal to 2, and each of the secondary batteries comprises a first electrode lead and a second electrode lead having opposite polarities, the first electrode lead has a melting point higher than that of the second electrode lead, and N first electrode leads of the first battery unit and N second electrode leads of the second battery unit are arranged to form a layered construction, wherein the battery module has a plurality of connection points distributed in the layered construction and formed in a welding process, the number of the connection points is greater than or equal to N, and each of the connection points is adapted to directly connect one of the first electrode leads of the first battery unit to at least one of the second electrode leads of the second battery unit so as to electrically connect the one of the first electrode leads of the first battery unit to the at least one of the second electrode leads of the second battery unit, wherein the first electrode lead extends in a first direction, and each of the N first electrode leads of the first battery unit has an avoidance area to avoid other first electrode lead(s) in a second direction, wherein the connection point is disposed at the avoidance area so as to directly connect one of the first electrode leads of the first battery unit to at least one of the second electrode leads of the second battery unit, and the second direction intersects with the first direction.

2. The battery module according to claim 1, wherein the first electrode lead is formed as a sheet-like electrode lead extending in the first direction, and projections of the N first electrode leads of the first battery unit on a surface of the second electrode lead of the second battery unit are staggered with each other in the second direction.

3. The battery module according to claim 2, wherein the N secondary batteries of the first battery unit are connected in parallel, and each of the first electrode leads has a dimension less than or equal to 1/N of a dimension of the second electrode lead in the second direction.

4. The battery module according to claim 1, wherein the first electrode lead has a first connection portion and a first hollow portion, wherein in the first battery unit, the first hollow portion of each of the first electrode leads is disposed corresponding to the first connection portion(s) of other first electrode lead(s) in a layering direction, such that the first connection portion of the first electrode lead is exposed through the first hollow portion(s) of other first electrode lead(s), and the connection points are disposed at the first connection portions.

5. The battery module according to claim 4, wherein the first hollow portion is an opening provided on the first electrode lead.

6. The battery module according to claim 4, wherein the first hollow portion has a dimension greater than or equal to twice of a dimension of the connection point in the first direction.

7. The battery module according to claim 4, wherein the first connection portion of each of the first electrode leads has a dimension less than or equal to 1/N of a dimension of the second electrode lead in the second direction.

8. The battery module according to claim 1, wherein each of the second electrode leads of the second battery unit is adapted to avoid other second electrode lead(s) in the second direction, such that each of the connection points is adapted to electrically connect one of the first electrode leads of the first battery unit to one of the second electrode leads of the second battery unit.

9. The battery module according to claim 1, further comprising:

an electrical connector having a connection surface, wherein the first electrode leads of the first battery unit and the second electrode leads of the second battery unit are stacked on the connection surface of the electrical connector.

* * * * *